United States Patent [19]

Schwitters et al.

[11] Patent Number: 4,580,905

[45] Date of Patent: Apr. 8, 1986

[54] FLAVOR MIXING AND DISPENSING DEVICE FOR FROZEN CONFECTION MACHINES

[75] Inventors: Stephen W. Schwitters; A. Clark Larson, both of Rockford; Preston L. Aylesworth, Rockton, all of Ill.

[73] Assignee: Speciality Equipment Companies, Inc., Taylor Freezer Division, Rockton, Ill.

[21] Appl. No.: 730,657

[22] Filed: May 6, 1985

[51] Int. Cl.⁴ .............................................. A23G 9/00
[52] U.S. Cl. ...................................... 366/149; 62/342; 99/455; 222/129.1; 222/135; 222/145; 366/155; 366/177; 366/194; 366/290
[58] Field of Search ................ 366/177, 149, 182, 194, 366/148, 154, 155, 169, 172, 165, 173, 182, 308, 194–196, 279, 290; 222/145, 129.1, 135, 226, 229, 236, 237; 62/342, 343; 426/565; 99/452–455

[56] References Cited

U.S. PATENT DOCUMENTS

2,262,293 11/1941 Lilja et al. .
2,736,534 2/1956 Atkins .
3,224,740 12/1965 Kuehn et al. .
3,276,633 10/1966 Rahauser .
3,830,407 8/1974 Wierlo .
3,934,427 1/1976 Keyes .
3,934,759 1/1976 Giannella .............................. 62/342
4,378,164 3/1983 Manfroni ............................. 366/177

Primary Examiner—Timothy F. Simone
Attorney, Agent, or Firm—Vernon J. Pillote

[57] ABSTRACT

A flavor mixing and dispensing device for a frozen confection machine including an upright valve cylinder having a discharge outlet at its lower end and a frozen confection inlet port and a plurality of flavoring inlet ports spaced above its lower end. A rotary mixer is provided in the lower portion of the cylinder and a valve piston is slidable in the valve cylinder. The valve piston is formed with a downwardly opening cavity means for receiving the rotary mixer, and the rotary mixer and valve piston are constructed and arranged so that the mixer telescopes into the cavity means in the valve piston when the piston is moved to its lower position, and the mixer and valve piston substantially fill the mixing chamber in the lower portion of the valve cylinder to displace substantially all material from the valve cylinder at the end of a dispensing operation.

17 Claims, 18 Drawing Figures

Fig. 1

FLAVOR MIXING AND DISPENSING DEVICE FOR FROZEN CONFECTION MACHINES

BACKGROUND OF THE INVENTION

Various flavor mixing and dispensing devices have heretofore been made for mixing a flavoring material with a neutral frozen confection such as ice cream, frozen custard or the like to produce a flavored frozen confection. Some prior devices such as shown in U.S. Pat. Nos. 2,262,293; 2,736,534; 3,224,740; and 3,830,407 utilized a mixing and dispensing device having a single mixing chamber and a single rotary mixer connected to the outlet of a frozen confection freezer, and with a selector valve arrangement which enabled introduction of a selected one of a plurality of different flavoring materials into the mixing chamber for a mixture therein with the frozen confection to produce a flavored frozen confection. Such prior devices, however, were not entirely satisfactory because of flavor carry-over when changing from one flavoring material to another. A volume of mixed product containing the neutral frozen confection and a flavoring material remained in the mixing chamber at the completion of a dispensing operation and, when the dispenser was changed to dispense material of a different flavor, the volume of mixed material that remained in the mixing compartment from the previous dispensing operation, was discharged during the initial portion of a subsequent dispensing operation. Some flavoring materials such as chocolate are very strong and only a small amount of such flavoring materials can adversely affect the flavor of the mixed product, when dispensing a different flavor. U.S. Pat. No. 3,830,407 recognizes this problem and suggests, as a means of limiting contamination, that one of the inlet tubes to the mixing chamber be interconnected with a source of water such that the dispensing nozzle can be flushed before a different flavor is dispensed.

In order to avoid the problems of flavor carry-over, it has also been proposed as disclosed in U.S. Pat. Nos. 3,276,633; 3,934,427 and 3,934,759, to use a plurality of mixing chambers, one for each flavor to be dispensed with a separate mixer in each mixing chamber. Use of multiple mixing chambers and mixers not only increases the cost of producing the multiple flavor mixing and dispensing device, but also markedly complicates the time and trouble encountered in cleaning the mixing and dispensing apparatus.

U.S. Pat. No. 4,378,164 discloses a dispensing unit for ice cream machines in which a selected one of a plurality of different flavoring materials is introduced into the periphery of a rotor that is disposed just above a star shaped extrusion port so that the flavoring material is carried into the ice cream primarily through the radial slits of the star shaped extrusion port to be located primarily on the portion of the ice cream that passes through the outer portions of the radial slits. The dispensing unit of this patent is not arranged to uniformly intermix the flavoring material with the neutral frozen confection to produce a flavored frozen confection. In order to minimize carry-over of flavor from one dispensing operation to the next, the patent suggests that the electrically operated flavor control valves be deenergized at the end of each dispensing operation a little in advance with respect to the ice cream admission to the cylinder, so that the last amount of ice cream delivered will eliminate flavoring syrup from the dispenser. However, in order to achieve substantially uniform mixing of the flavoring material in the frozen confection as the materials pass from their inlet ports to the discharge outlet, it is necessary to provide a mixing chamber having a relatively large volume. It would accordingly be necessary to pass a relatively large volume of frozen confection through the mixing chamber, after shut-off of the flavoring material, to purge substantially all of the flavored frozen confection from the mixing chamber.

SUMMARY OF THE INVENTION

It is an object of the present invention to overcome the disadvantages of the prior art by providing a flavor mixing and dispensing device having a single mixing chamber and a rotary mixer for mixing and dispensing a selected flavoring syrup with a frozen confection, and which is constructed and arranged to discharge substantially all of the mixed product from the mixing chamber at the completion of the dispensing cycle, to minimize flavor carryover when changing from one flavor to another.

Accordingly, the present invention provides a flavor mixing and dispensing device for a frozen confection machine including a valve body adapted for mounting on the discharge end of a frozen confection freezer and having an upright valve cylinder therein, the lower portion of the valve cylinder defining a mixing chamber and having a discharge outlet at the lower end of the mixing chamber, a frozen confection inlet port and at least one flavor inlet port opening into the valve cylinder at locations spaced above the discharge outlet. A rotary mixer is mounted in the mixer chamber, and a valve piston is mounted for sliding movement in the valve cylinder between a lower position in which the lower end of the piston is adjacent the discharge outlet and a raised position in which the lower end of the piston is spaced above the discharge outlet sufficient to allow frozen confection and flavoring material to enter the cylinder. The rotary mixer has vane means operative when the piston is in its raised position to mix frozen confection and flavoring material in the mixing chamber, and the piston includes downwardly opening cavity means movable vertically with the piston for telescopically receiving the mixer when the piston is moved down to its lower position. The mixer and piston are so constructed and arranged that, when the piston is in its lower position, the piston and mixer substantially fill the space in the mixing chamber to displace substantially all of the mixture of frozen confection and flavoring material from the mixing chamber.

DETAILED DESCRIPTION

Figure 1:
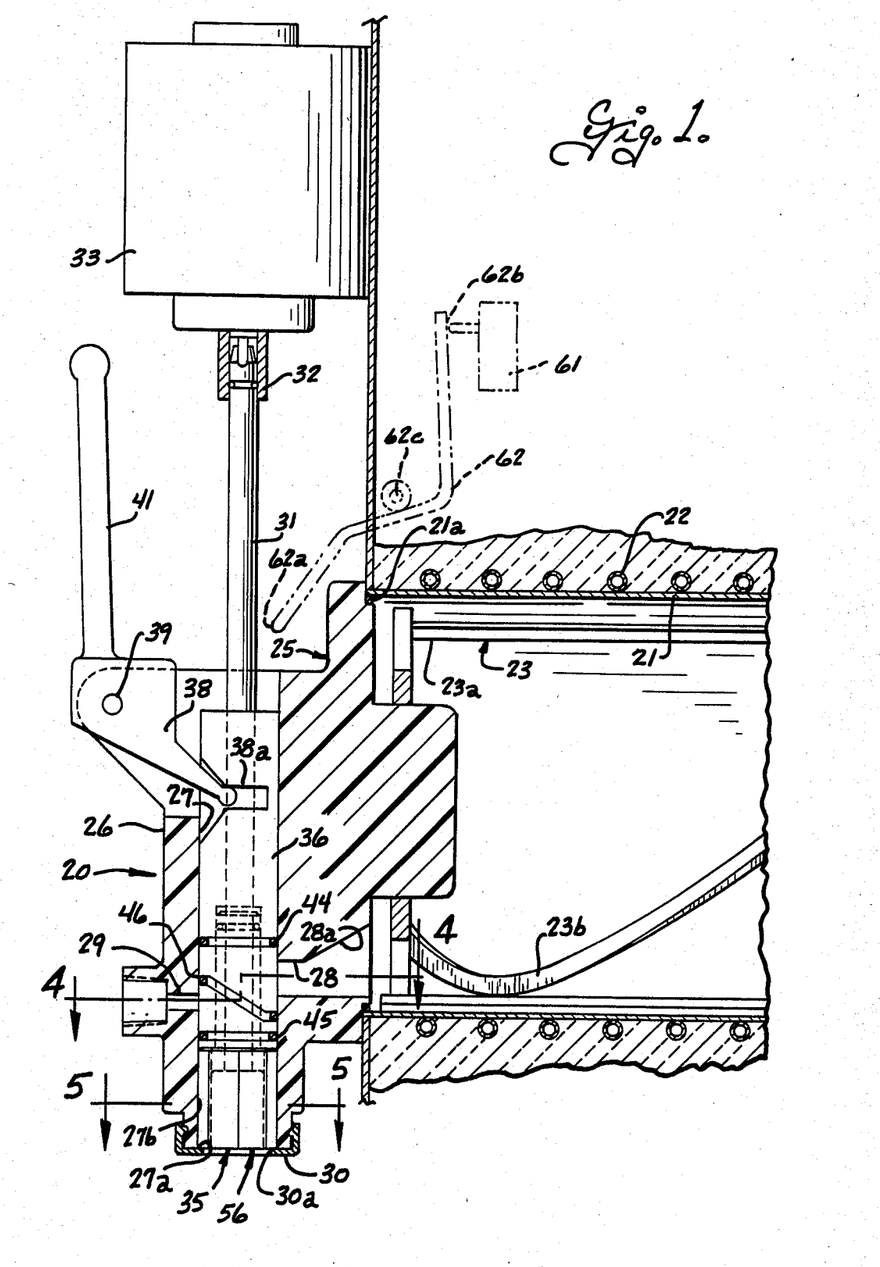
FIG. 1 is a fragmentary vertical sectional view through the freezing cylinder of a frozen confection machine having the flavor mixing and dispensing device of the present invention applied thereto.
Figures 2, 3:
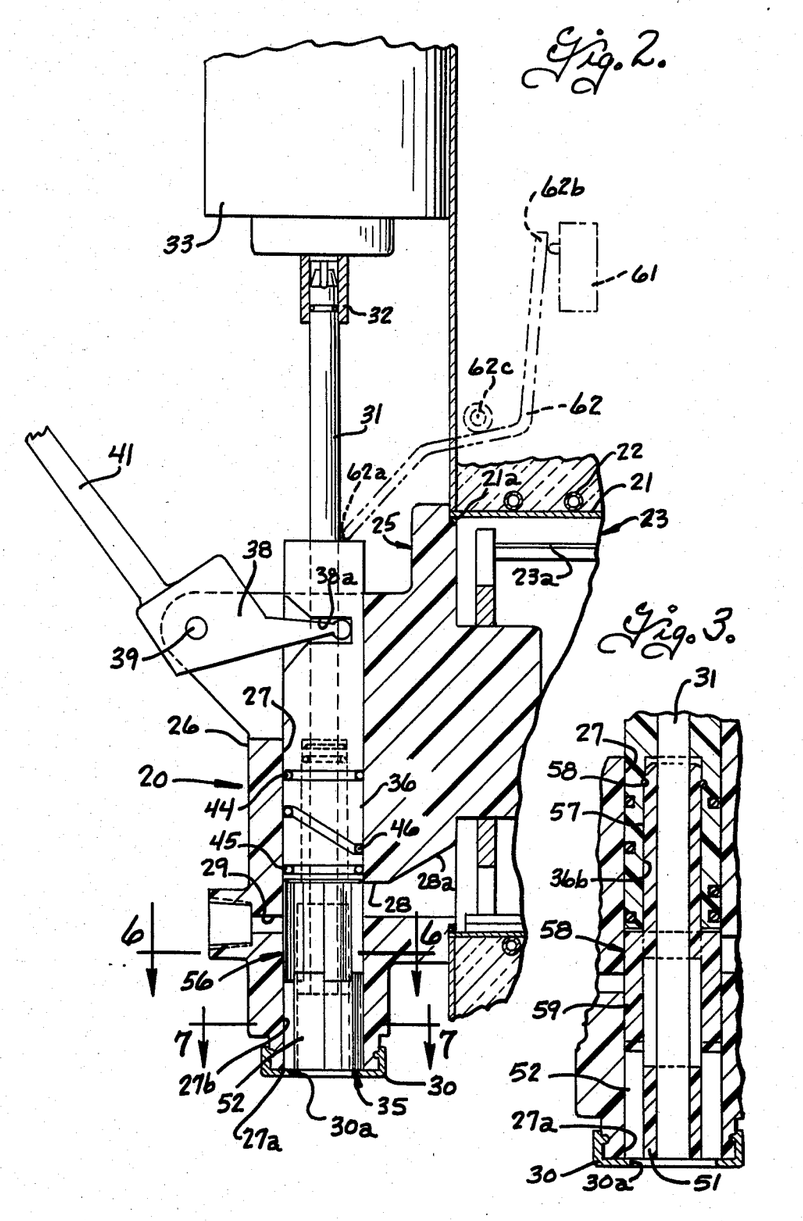
FIG. 2 is a fragmentary vertical sectional view of the device of FIG. 1 showing the parts in a moved position.
FIG. 3 is a fragmentary vertical sectional view through the valve piston and mixer in the position of FIG. 2.

The present invention relates to a flavor mixing and dispensing device 20 for a frozen confection machine and is shown in FIGS. 1 and 2 mounted on the discharge end of a frozen confection freezer. The frozen confection freezer is of conventional construction and includes a generally horizontally disposed freezing barrel 21 having a discharge end 21a. A liquid confection mix such as ice cream, custard, yougurt mix or the like is introduced into the freezing barrel through an inlet (not shown) and the barrel is refrigerated to freeze product on the inner surface. As shown in FIGS. 1 and 2, the evaporator 22 of a conventional refrigeration mechanism (not shown) is disposed around the outer side of the frezing barrel. As is conventional, the refrigerating mechanism also includes a compressor, condenser, and expansion control, and the refrigerating mechanism is operated under a temperature responsive controller to maintain the freezing barrel at the desired temperature for freezing the confection mix on the inner surface of the barrel.

A rotor 23 is rotatably mounted on the freezing barrel for removing frozen product from the inner surface of the barrel, and for mixing and/or aerating the product in the barrel, and for advancing the product toward the discharge end 21a of the barrel. The rotor is driven by a beater drive mechanism (not shown) and which drive mechanism commonly includes an electric drive motor and a speed reducing mechanism for connecting the drive motor to the rotor. The rotor also includes scraper blades 23a for scraping frozen product off the inner surface of the freezing barrel and a means such as a helical flight bar 23b for advancing the product toward the discharge end 21a of the freezing barrel.

Figure 4:
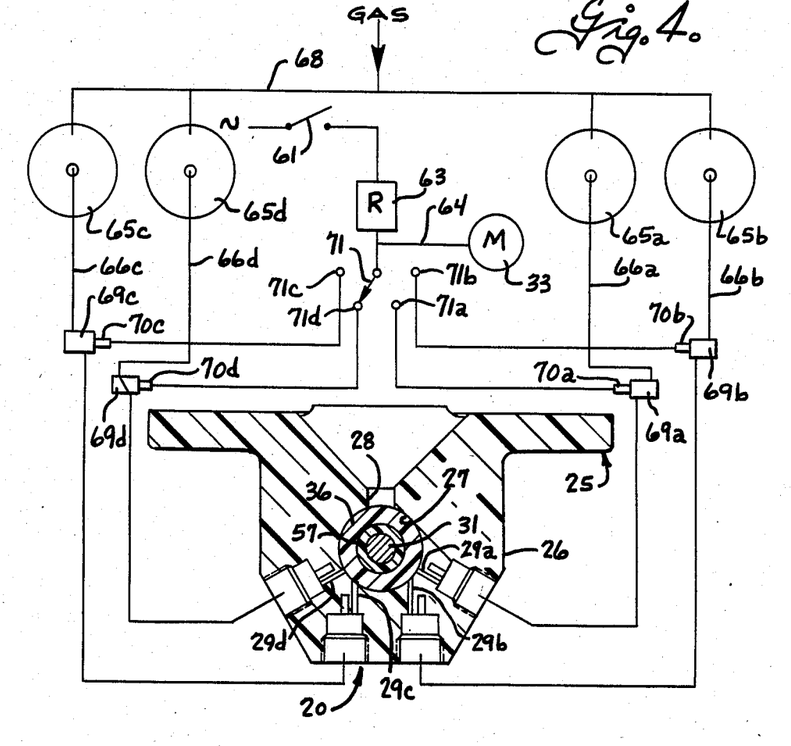
FIG. 4 is a fragmentary horizontal sectional view taken on the plane 4—4 of FIG. 1.

A door or cover 25 is removably mounted on the discharge end of a freezing cylinder to provide a closure for the same and the flavor mixing and dispensing device is conveniently formed integrally with the door 25. The flavor mixing and dispensing device includes a valve body 26 having an upright valve cylinder 27 with a discharge outlet 27a at the lower end of the valve cylinder. A cap 30 is removably mounted at the lower end of the valve cylinder and defines a discharge port 30a. A frozen confection inlet port 28 opens into the valve cylinder at a location spaced above the discharge outlet 27a and communicates through a passage 28a with the discharge end of the freezing barrel 21 to receive frozen confection material from the frozen confection freezer. The flavor mixing and dispensing device is particularly adapted for mixing a selected one of a plurality of different flavoring materials with the frozen confection from the freezer and is preferably provided with a plurality of flavor inlet ports 29, one for each of the different flavors to be mixed. As shown in FIG. 4, four separate flavor inlet ports are provided and designated 29a–29d. The multiple flavor inlet ports are angularly spaced apart about the axis of the valve cylinder as shown in FIG. 4 and are spaced above the discharge outlet 27a of the valve cylinder, as shown in FIGS. 1 and 2. In the preferred embodiment shown, the several flavoring materials are preferably supplied to the valve cylinder through separate flavor inlet ports, to prevent intermixing of the different flavoring materials. It is apparent, however, that different flavoring materials could be supplied under the control of flavor control valves in the several flavor supply lines to to a common flavor inlet port, but that some objectionable intermixing of the different flavoring materials would probably occur at the common inlet port.

The frozen confection inlet port and flavor inlet ports are spaced above the discharge outlet 27a of the valve cylinder a distance sufficient to provide a mixing chamber 27b therebelow in the lower portion of the valve cylinder. A mixer drive shaft 31 is detachably connected at its upper end through a coupling 32 to a mixer drive motor 33, and the mixer drive shaft extends down into the valve cylinder 27 and has a rotary mixer 35 mounted on its lower end and disposed in the mixing chamber 27b. A valve piston 36 is slidably disposed in the valve cylinder for movement between the lower position as shown in FIG. 1 and a raised position as shown in FIG. 2. In the embodiment illustrated, the valve piston is manually operated between its lowered and raised positions by a lever 38 that is pivotally mounted by a pivot pin 39 on the valve body and which has a bifurcated outer end defining spaced ears that extend into laterally opening notches 38a in the outer side of the valve piston. A handle 41 is connected to the lever 38 to enable manual operation of the lever and valve piston.

The valve piston is arranged to block flow through the frozen confection inlet port 28 and the flavor inlet ports 29 into the cylinder, when the valve piston is in its lower position shown in FIG. 1, and to uncover these ports and allow flow into the valve cylinder when the valve piston is in its raised position shown in FIG. 2. The valve piston has a cross section to have a close fit in the valve cylinder and, as shown in FIGS. 1 and 2, O-rings 44 and 45 are disposed in grooves in the valve piston and sealingly engage the walls of the valve cylinder at locations respectively above and below the confection inlet port 28 and flavor inlet ports 29, when the valve piston is in its lower position. A diagonal O-ring 46 is advantageously mounted in a diagonal groove in the valve piston between the O-rings 44 and 45 and arranged so that it blocks flow between the confection inlet port 28 and the flavor inlet ports 29a–29d, when the valve piston is in its lower position.

Figures 5, 6, 7:
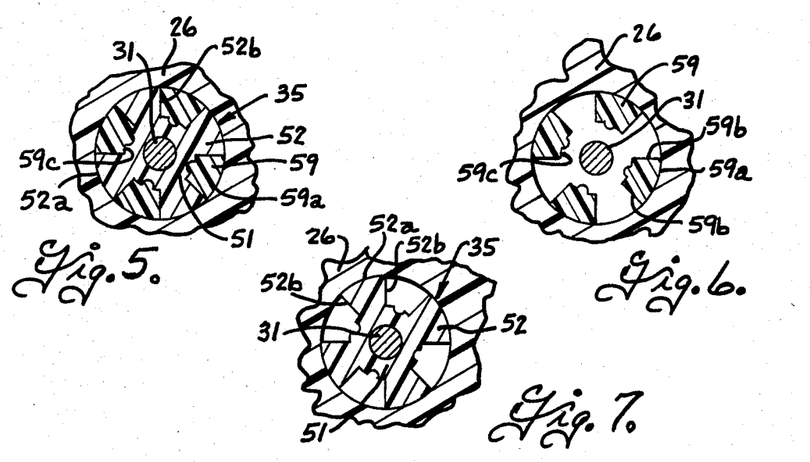
FIG. 5 is a fragmentary horizontal sectional view taken on the plane 5—5 of FIG. 1.
FIG. 6 is a fragmentary horizontal sectional view taken on the plane 6—6 of FIG. 2.
FIG. 7 is a fragmentary horizontal sectional view taken on the plane 7—7 of FIG. 2.

In accordance with the present invention, the valve piston 36 and the mixer 35 are constructed and arranged such that, when the valve piston is moved to its lower position, the valve piston and mixer telescopically interfit and substantially fill the space in the mixing chamber to displace substantially all of the confection and flavoring material from the mixing chamber. In the presently preferred embodiment illustrated in FIGS. 1–7, the mixer 35 comprises a hub 51 that is non-slidably and non-rotatably secured to the lower end of the mixer drive shaft 34, and a plurality of vanes 52, herein shown four in number and which extend outwardly from the hub at angularly spaced locations. As best shown in FIGS. 5 and 7, the vanes 52 have outer end walls 52a, of transversely arcuate configuration and which extend closely adjacent the side walls of the mixing chamber and side walls 52b defined by lines that extend parallel to the axis of the mixer, and which side walls are angularly spaced apart to form spaces between adjacent side walls. The valve piston 36 includes a member 56 mounted on the valve piston for vertical movement therewith and for rotation relative thereto about the axis of the valve cylinder, and which is arranged to telescopically interfit with the mixer when the valve piston is moved to its lowered position. As best shown in FIG. 3 the member 56 has a tubular stem 57 that rotatably extends into a cylindrical cavity 36b in the lower end of the valve piston 36, and an O-ring 58 is disposed in a groove in the stem 57 and is adapted to be received in a groove in the cavity 36b in the valve piston, when the stem is inserted into the cavity. The O-ring 58 is arranged to have a tight fit in the cavity 36b as it is pressed thereinto and expands when it is opposite the groove in the cavity in the valve piston to provide a fit which allows rotation of the stem 57 in the cavity, while retaining the stem in the cavity for axial movement with the valve piston. The member 56 has a plurality of vanes 59 rigid with the lower end portion of the tubular stem 57 and which extend downwardly from the stem at angularly spaced locations therearound. The vanes 59 are shaped to be slidably receivable between the vanes 52 on the mixer and to substantially fill the spaces between adjacent vanes on the mixer when the valve member is in its lower position. As best shown in FIGS. 5 and 6, the vanes 59 have an outer wall 59a of transversely arcuate cross section and which conforms to the surface of the valve cylinder, and spaced side walls 59b formed complimentary to the side walls 52b of the vanes 52 on the mixer, to be slidable therebetween. The vanes 59 have an inner wall 59c formed complimentary to the adjacent portions of the hub 51 on the mixer. The vanes 52 on the mixer and the vanes 59 on the member 56 preferably have substantially the same length so as to be coextensive when the valve piston is in its lower position, and the upper end of the hub 51 is recessed below the upper ends of the vanes 52 so as to receive the lower end portion of the stem 57, when the valve piston is in its lower position shown in FIG. 1. The hub 51 and stem 57 preferably have the same diameter and, as shown, the stem extends down to a level below the upper ends of the vanes 59 so as to be closely adjacent the upper end of the hub 51 of the mixer, when the valve member is in its lower position. With this arrangement, the mixer is arranged to move into the central cavity and the radially extending cavities in the member 56, to substantially fill these cavities and displace substantially all of the confection material and flavoring material mixture from the mixing compartment, when the valve member is in its lower position. When the valve member is moved to its raised position as shown in FIG. 2, the member 56 is raised to a position in which a major portion of the vanes 59 on the member 56 are raised above the vanes 52 on the mixer. When the piston is in its raised position shown in FIG. 2, frozen confection material and flavoring material can enter the valve cylinder from the respective ports 28, 29, through the spaces between the vanes 59 on the member 56, and the material can flow down through these spaces and through the annular space between the shaft 31 and the inner surfaces 59c of the ribs and into the spaces between the vanes 52 on the mixer.

The mixer drive motor 33 is energized when the valve piston is moved to its raised position to rotate the mixer 35 and the lower end portions of the vanes 59 on the member 56 extend into the spaces between the upper portion of the vanes 52 on the mixer so that the member 56 is rotated with the mixer. The vanes 59 on the member 56 and the vanes 52 on the mixer produce a thorough mixing of the flavoring material into the frozen confection material and a uniformily mixed product is discharged through the outlet port 30a at the lower end of the valve cylinder. At the end of a dispensing operation, the handle 41 is operated to move the piston downwardly back to the lower position shown in FIG. 1 and the piston shuts off flow of frozen confection and flavoring syrup from the respective ports 28 and 29 into the valve cylinder and the member 56 on the lower end of the piston telescopes with the vanes on the mixer until the lower end of the vanes on the member 59 are adjacent the discharge outlet. As previously described, the vanes on the member 56 are arranged to substantially fill the spaces between the vanes on the mixer when the piston is in its lower position, to thereby displace substantially all of the mixed product from the mixing chamber.

Provision is made for starting the mixer drive motor 33 when the valve piston 36 is moved to its raised position. As diagrammatically shown in FIGS. 1 and 2, a switch 61 is provided on the frozen confection machine and is operated by a lever 62 that is pivotally mounted intermediate its ends at 62c. One end 62a of the lever is positioned in the path of movement of the dispensing position when it approaches its raised position and the other end 62b of the lever is arranged to operate the switch 61. As diagrammatically shown in FIG. 4, switch 61 is normally open and is connected in a circuit with a relay 63 to energize the relay when the switch is closed in response to raising of the valve piston. Relay 63 is connected through a line 64 to the mixer drive motor to energize the same, when the relay is operated.

As diagrammatically illustrated in FIG. 4, flavoring material is supplied to the several flavor inlet ports 29a–29d from syrup supply reservoirs designated 65a–65d, respectively through lines 66a–66d. As is conventional, the flavoring materials in the reservoirs 65a–65d are maintained under gaseous pressure as by gas from a gas supply line 68, and flavor control valves 69a–69d are provided in the syrup supply lines 66a–66d respectively to control the flow of flavoring material to the respective inlet port 29a–29d. Valves 69a–69d have electroresponsive operators such as solenoids 70a–70d respectively and a multi-position selector switch 71 having contacts 71a–71d is provided to enable selection of the solenoid to be energized to operate the corresponding flavor control valve to its open position. The flavor control valve 69a–69d are preferably opened when the valve piston is moved to its raised position and closed as it is moved away from its raised position towards closed position. For this purpose, selector switch 71 is connected to the relay 63 so that power is supplied to the selector switch when the relay is operated in response to raising of the valve piston. The lever 62 is preferably arranged to operate switch 61 to deenergize the relay 63 and hence electroresponsives operator for the flavor material control valve as the valve piston starts to move towards its closed position and before the valve piston shuts off flow of the frozen confection through port 28 so that the last amount of frozen confection that enters the valve cylinder during a dispensing operation will tend to purge the flavored mixture in the mixing chamber, before the valve piston is moved to its fully lowered position as shown in FIG. 1. This reduces the concentration of flavoring material in any of the mixture that does remain in the mixing chamber in the interstices between the mixer 35 and the member 56.

Figures 8, 10, 11:
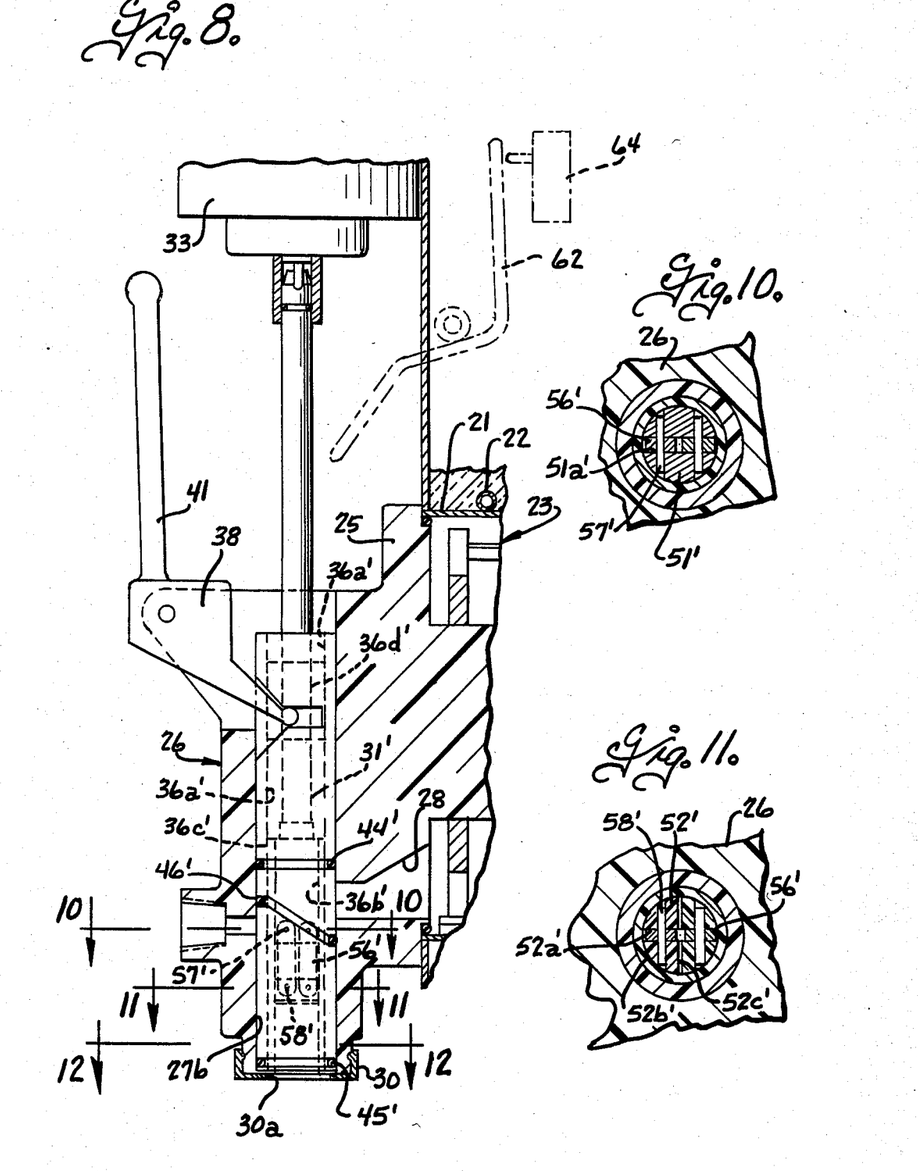
FIG. 8 is a fragmentary vertical sectional view through the freezing cylinder of a frozen confection machine and illustrating a modified form of flavor mixing and dispensing device applied thereto.
FIG. 10 is a fragmentary horizontal sectional view taken on the plane 10—10 of FIG. 8.
FIG. 11 is a fragmentary horizontal sectional view taken on the plane 11—11 of FIG. 8.
Figures 9, 12, 13:
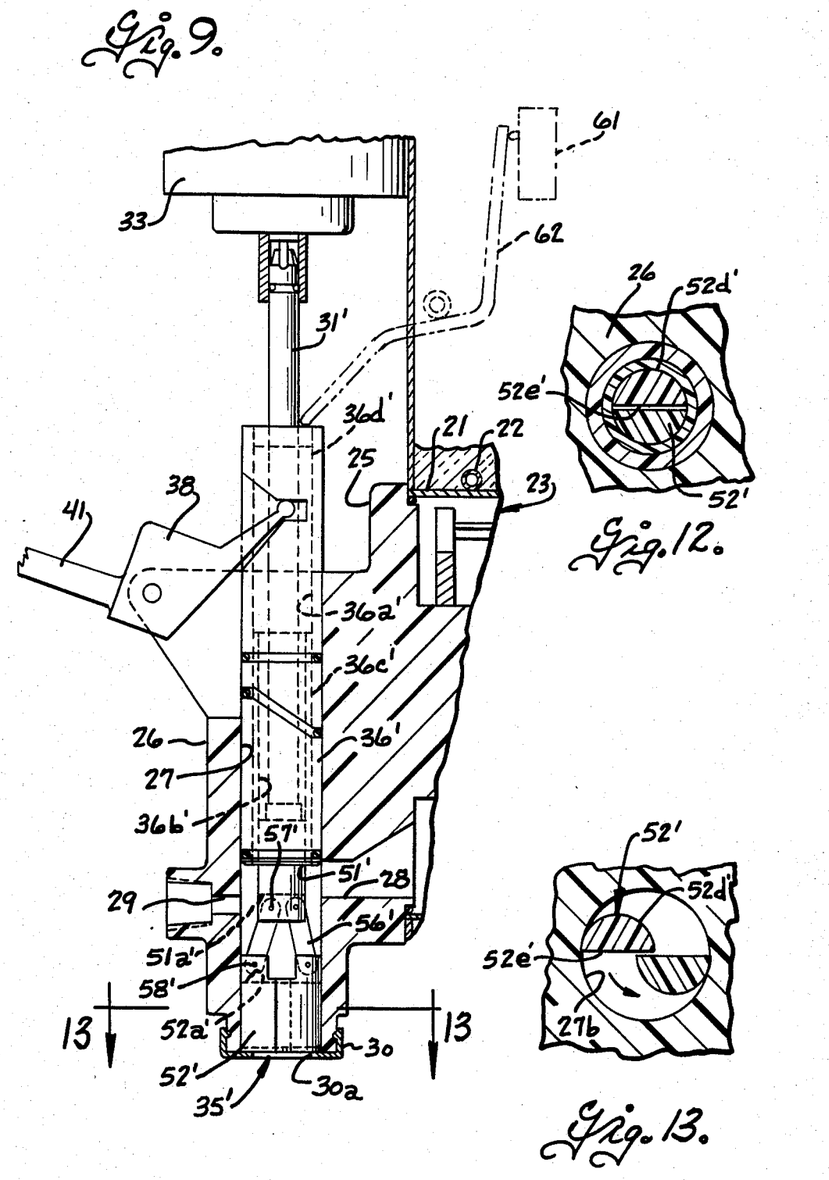
FIG. 9 is a fragmentary vertical sectional view of the flavor mixing and dispensing device of FIG. 8 and illustrating the parts in a moved position.
FIG. 12 is a fragmentary horizontal sectional view taken on the plane 12—12 of FIG. 8.
FIG. 13 is a fragmentary horizontal sectional view taken on the plane 13—13 of FIG. 9.

A second embodiment of the flavor mixing and dispensing device for a frozen confection machine is illustrated in FIGS. 8–13. In this embodiment, the frozen confection freezer and door 25 and valve body 26 are the same as that in the embodiment of FIGS. 1–7, and like numerals are used to designate the same parts. This embodiment has a modified form of valve piston and mixer and like numerals followed by the postscript ' are used to designate modified parts. The mixer 35' has a plurality of vanes disposed in the mixing chamber 27b of the valve cylinder, and which vanes are connected to a hub 51' on the lower end of the mixer shaft 31' for radial movement relative thereto between a radially contracted position spaced inwardly of the walls of the mixing chamber and a radially expanded condition adjacent the walls of the mixing chamber. In this embodiment, a pair of links 56' are pivotally mounted by pivot pins 57' in a transverse slot 51a' in the lower end of the hub 51', for swinging movement relative to the hub in planes extending generally radially of the axis of the mixer shaft. The lower end of each link extends into a slot 52a' in the upper end portion of a respective one of the vanes 52' and the links are connected to the upper end of the respective vane by pivot pins 58' that extend parallel to and are spaced below the pivot pins 57'. With this arrangement, the vanes 52' can shift radially between a radially contracted position as shown in FIG. 8 and radially expanded condition as shown in FIG. 9.

The mixer vanes are shaped so that they interfit when they are in their contracted position and form a substantially solid composite body of generally cylindrical configuration. As best shown in FIG. 11, the vanes 52' have as semi-cylindrical upper portion with a semi-cylindrical outer wall 52b' and a diametrically extending wall 52c' that is disposed parallel to the axis of the respective pivot pin 58' and the vanes also have a semi-cylindrical lower portion having a semi-cylindrical outer wall 52d' and a diametrically extending wall 52e' disposed in a plane perpendicular to the axis of the respective pivot pin 58' as best shown in FIGS. 12 and 13. When the vanes are in their contracted position, the diametrically extending faces 52c' of the upper portions of the vane are disposed in substantially face-to-face contact as shown in FIG. 11 and the faces 52e' of the lower vane portions are also disposed in substantially face-to-face contact as shown in FIG. 12. The two vanes form a generally cylindrical body when the vanes are in their radially contracted position and the upper ends of the vanes are disposed adjacent the lower end of the hub 51' while the lower ends of the vanes are disposed adjacent the discharge outlet. Thus, when the vanes are in their contracted position, they form a generally cylindrical composite body, and the links 56' extend parallel to the axis of the mixer shaft 31' and substantially fill the slots in the hub 51' and in the upper portion of the vanes 52'.

The valve piston 36' is slidably disposed in the valve cylinder 27 for movement between a lower position as shown in FIG. 8 with the lower end of the valve piston adjacent the discharge outlet 27a, and a raised position as shown in FIG. 9 in which the lower end of the valve piston is disposed above the confection inlet port 28 and the flavor inlet ports 29, to allow frozen confection and flavoring material to enter into the valve cylinder. The valve piston has a cavity 36b' in its lower end portion that opens at the lower end of the valve piston and which is dimensioned to closely receive the hub 51' and vanes 52' of the mixer 35' when the piston is in its lower position as shown in FIG. 8. The valve piston can conveniently be formed with a through bore 36a' and a sleeve 36c' of a wear resistant material is pressed into the lower end of the through bore to define the cavity 36b' and a sleeve 36d' is pressed into the upper end of the through bore to provide a bearing for the mixer shaft. In the embodiment illustrated, the vanes 52' are radially contractable to form a composite cylindrical body having an outer diameter approximately the same as the outer diameter of the hub 51', and the cavity 36b' in the piston has a generally cylindrical configuration throughout its length of a size to closely receive the hub and radially contracted vanes 52' therein. The valve piston has a close sliding fit in the valve cylinder and an upper O-ring 44' is disposed in a groove in the valve piston at a location to be positioned above the confection and flavor inlet ports, when the valve is in its lower position. A second O-ring 45' is disposed in a groove in the lower end of the piston to block flow of frozen confection and flavor material to the discharge outlet when the valve is in its lower position, and a diagonally extending O-ring 46' is disposed in a diagonal recess in the valve piston at a location to block flow between the confection inlet port 28 and the flavor inlet ports 29, when the valve piston is in its lower position.

As in the preceding embodiment, the lever 38 engages the valve piston and is manually operable by handle 41 to move the valve piston to a raised position as shown in FIG. 9 in which the lower end of the valve piston is disposed above the confection inlet port 28 and flavor inlet ports 29. When the valve piston is in its raised position, it is also spaced above the links 56' and vanes 52' of the mixer. As described in connection with the preceding embodiment, switch 64 is operated by a lever 62 when the valve piston reaches its raised position and this starts the mixer drive motor. The vanes 52' of the mixer are centrifugally moved outwardly when the mixer is rotated in the direction indicated by the arrow in FIG. 13 so that the vanes extend alongside the walls as shown in FIG. 9 and 13, to mix the frozen confection and flavor material as it passes from the respective ports to the discharge outlet. As also described in connection with the preceding embodiment, flavor control valves 69a–69d are operated under the control of selector switch 71 and switch 61 to control the flow of the selected flavor material to the valve cylinder. When the valve piston is thereafter moved downwardly, switch 61 is opened to deenergize the mixer drive motor and facilite radial contraction of the vanes on the mixer. The lower end of the valve piston engages the links 56' and cams the links and vane members 52' of the mixer inwardly to their contracted position, and the mixer telescopes into the cavity in the valve piston to substantially fill the same when the valve piston is in its lower position. Thus, as the valve piston is lowered, the mixer is radially contracted and telescopes into the downwardly opening cavity in the valve piston so that the mixer and valve pistons substantially fill the space in the mixing chamber and displace substantially all of the mixed product in the mixing chamber.

Figures 14, 16, 17:
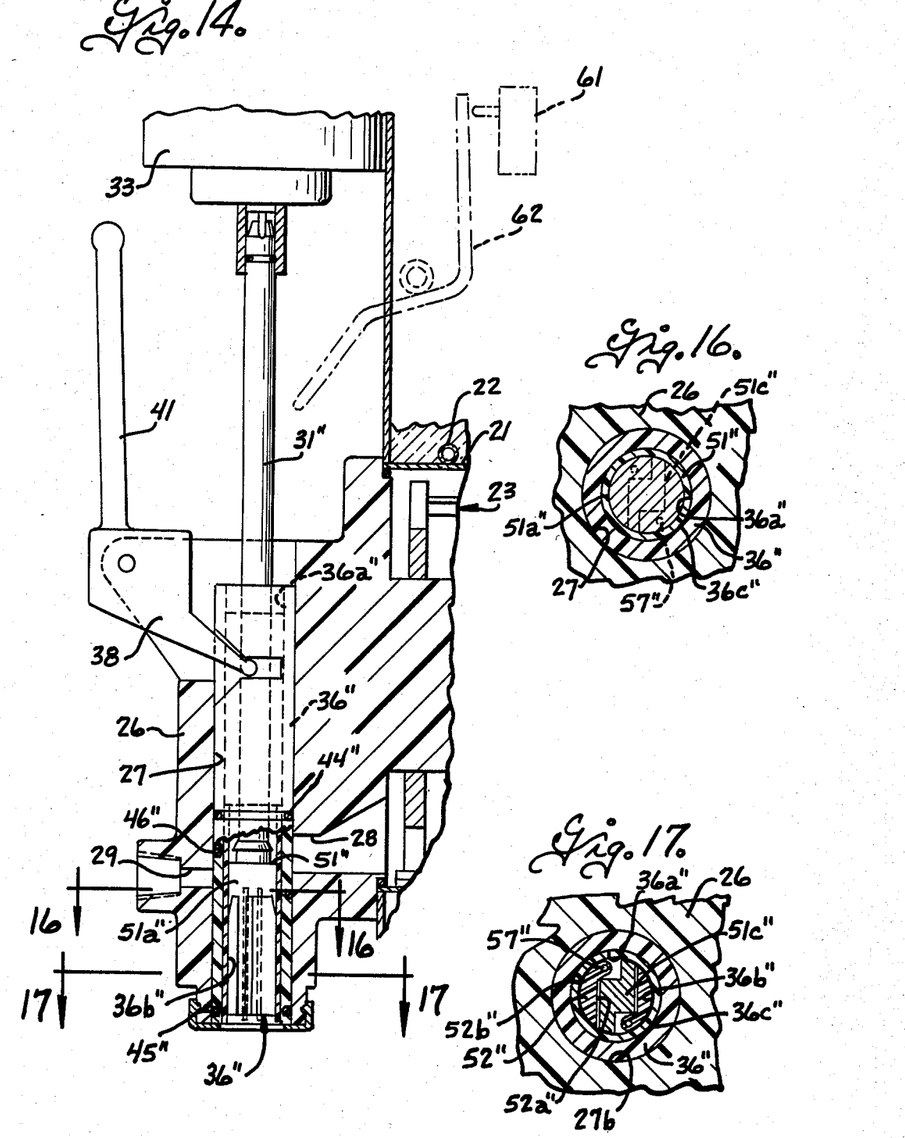
FIG. 14 is a fragmentary vertical sectional view through the discharge end of the freezing cylinder of a frozen confection machine having a further modified form of the flavor mixing and dispensing apparatus applied thereto.
FIG. 16 is a fragmentary horizontal sectional view taken on the plane 16—16 of FIG. 14.
FIG. 17 is a fragmentary horizontal sectional view taken on the plane 17—17 of FIG. 14.
Figures 15, 18:
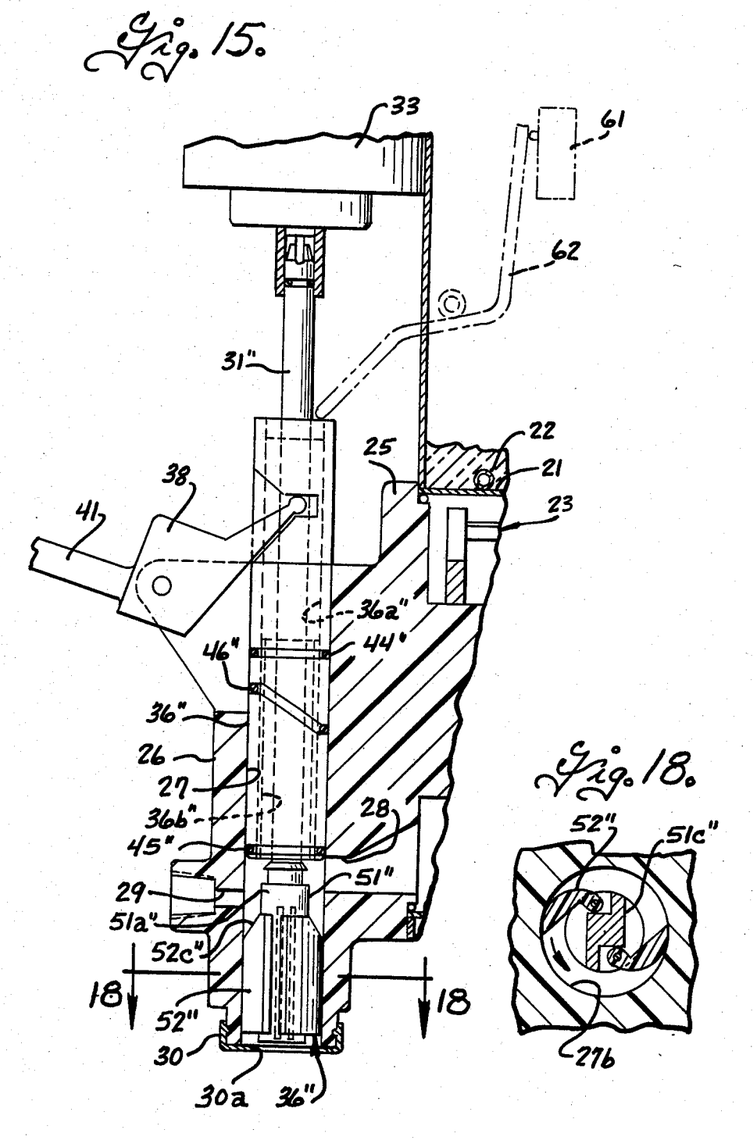
FIG. 15 is a fragmentary vertical sectional view of the flavor mixing and dispensing apparatus of FIG. 14, and illustrating the parts in a moved position.
FIG. 18 is a fragmentary horixontal sectional view taken on the plane 18—18 of FIG. 15.

A third embodiment of the flavor mixing and dispensing device is illustrated in FIGS. 14–17. In this embodiment, like numerals are used to designate the same parts as in the embodiment of FIGS. 1–7, and modified parts followed by the postscript ", are used to designate modified parts. In this embodiment, the rotary mixer 35" includes a pair of vanes 52" mounted on a hub 51" for movement between a radially contracted position as shown in FIG. 14, and a radially expanded position as shown in FIG. 15. The hub 51" is rigidly secured to the lower end of the shaft 31" for rotation therewith and includes an upper hub portion 51a" and a lower hub portion 51b", and a web portion 51c" extending between the upper and lower hub portions. The vanes 52" are pivotally mounted on the hub portions by pivot pins 57" that extend between the upper and lower hub portions, for swinging movement about axes that extend parallel to the axis of the mixer shaft 31", and which are angularly spaced apart about the axis of the hub. The vanes have an inner wall 52a" formed generally complimentary to one side of the intermediate wall portion 51c" of the hub, and a semi-cylindrical outer wall portion 52b". The outer wall portions of the vanes are shaped so that, when the vanes are in their radially contracted position shown in FIG. 17, the vanes form a substantially solid composite body with the web portion of the hub, and which body has a generally cylindrical external configuration substantially the same as the diameter of the upper hub portion 51a". The valve piston 36" is substantially the same as that illustrated and described in connection with FIGS. 8–13, and has a central generally cylindrical cavity 36b" that opens at the lower end of the valve piston and which is dimensioned to receive and closely surround the mixer when the vanes are in their contracted position. As in the preceding embodiment, the valve piston has an upper O-ring 44", a lower O-ring 45" and a diagonally extending intermediate O-ring 46", arranged in the manner and for the purpose previously described in connection with the preceding embodiments. The valve piston 36" can conveniently be formed with the through bore 36a" and a sleeve 36c" of a wear resistant material is pressed into the lower end of the through bore and defines the aforesaid downwardly opening cavity 36b", and a sleeve 36d" is pressed into the upper end of through bore 36a" to provide a bearing for the mixer shaft.

As in the preceding embodiments, the hand operated lever 38 is arranged to move the valve piston from its lower position shown in FIG. 14 to its raised position shown in FIG. 15 and lever 62 operates switch 61 when the valve reaches its raised position to start the mixer drive motor. When the mixer is rotated in the direction indicated by the arrow in FIG. 18, the vanes 52" are centrifugally moved outward with their lead edges extending alongside the walls of the mixing chamber. The vanes operate to mix the frozen confection and flavoring material as it passes from the respective inlet ports to the discharge outlet. As in the preceding embodiments, the switch 61 is arranged to deenergize the drive motor as the valve piston moves away from its raised position and this stops rotation of the mixer and facilitates radial contraction of the vanes on the mixer. The upper edges 52c' of the vanes 52' on the mixer are inclined downwardly and outwardly as shown in FIG. 15 and the lower edge of the valve piston engages the upper edges 52c' of the vanes to cam the same inwardly as the valve piston is moved to its lower position. When the valve piston is in its lower position, the lower end of the piston is disposed adjacent the discharge outlet and the mixer including the hub and vanes is telescoped into the cavity 36b" in the valve piston so that the mixer and valve piston substantially fill the mixer chamber and displace substantially all of the material from the chamber.

From the foregoing it is thought that the construction and operation of the flavor mixing and dispensing device for a frozen confection machine will be readily understood. The valve piston and mixer are constructed and arranged to telescopically interfit when the valve piston is in its lowered position and to substantially fill the mixing chamber in the lower end of the valve cylinder, to displace substantially all material from the mixing chamber. This minimizes the flavor carry-over when the mixing and dispensing device is operated to dispense different flavors. In addition, since substantially all of the material is displaced from the mixing chamber when the valve piston is in its lower position, melting and dripping of material from the discharge outlet between dispensing operations, is also minimized. In order to further reduce flavor carry-over, the flavor control valves are advantageously operated to shut off flow of flavor material to the mixing chamber slightly before termination of flow of frozen confection material to the mixing chamber, so that the last frozen confection material that enters the mixing chamber tends to purge the previously mixed product from the mixing chamber during lowering of the valve piston. The door, valve cylinder and valve piston are advantageously formed of thermal insulating material such as a suitable synthetic resin material, to minimize melting and dripping of the frozen confection material.

The embodiments of the invention in which an exclusive property or privilege is claimed are defined as follows:

1. A flavor mixing and dispensing device for a frozen confection machine comprising, a valve body adapted for mounting on the discharge end of a frozen confection freezer and having an upright valve cylinder therein, the lower portion of the valve cylinder defining a mixing chamber and having a discharge outlet at the lower end of the mixing chamber, a frozen confection inlet port opening into the valve cylinder at a location spaced above the discharge outlet and adapted to receive frozen confection material from the frozen confection freezer, at least one flavor inlet port opening into the valve cylinder at a location spaced above the discharge outlet and adapted for connection to a source of flavor material, a rotatable mixer shaft extending axially of the valve cylinder and drive means connected to the upper end of the shaft for rotating the mixer shaft, a rotary mixer means mounted on the lower end of the mixer shaft and disposed in the mixing chamber with the lower end of the rotary mixer means adjacent the discharge outlet, piston means mounted for sliding movement in the valve cylinder between a lower position in which the lower end of the piston means is adjacent the discharge outlet and a raised position in which the lower end of the piston means is spaced above the discharge outlet sufficient to allow frozen confection material and flavoring material to enter the valve cylinder from the respective confection inlet port and flavor inlet port, the rotary mixer means having vane means operative when the piston means is in its raised position to mix frozen confection material and flavoring material in the mixing chamber, the piston means including means defining a downwardly opening cavity means movable vertically with the piston means for telescopically receiving the mixer means when the piston means is moved down to said lower position, the mixer means and piston means being so constructed and arranged that, when the piston means is moved to said lower position with said mixer means telescoped into said cavity means, the piston means and mixer means substantially fill the space in the mixing chamber to displace substantially all confection and flavoring material from the mixing chamber.

2. A flavor mixing and dispensing device according to claim 1 wherein said mixer means includes a hub and said vane means is attached to the hub and extends outwardly to the walls of the mixing chamber when the piston means is in said raised position.

3. A flavor mixing and dispensing device according to claim 1 wherein said mixer means includes a central hub and the vane means includes at least one vane extending outwardly from the hub to the walls of the cylinder when the piston means is in said raised position.

4. A flavor mixing and dispensing device according to claim 1 wherein said mixer means includes a central hub having its lower end adjacent the discharge outlet and at least one vane rigid with the hub and extending outwardly from the hub, the means defining a downwardly opening cavity means on the piston means includes a member mounted on the piston means for reciprocation therewith, said member having a downwardly opening central cavity for receiving a hub on the mixer means and at least one lengthwise extending slot extending outwardly on the central cavity for receiving a vane on the mixer means.

5. A flavor mixing and dispensing device according to claim 4 wherein said member is mounted on the piston means for rotation relative thereto about the axis of the valve cylinder.

6. A flavor mixing and dispensing device according to claim 5 including means connecting the member to the mixer means for rotation therewith when the piston means is in its raised position.

7. A flavor mixing and dispensing device according to claim 1 wherein said mixer means includes a central hub and at least one vane mounted on the hub for movement relative thereto between a radially contracted position adjacent the axis of the hub and a radially expanded position extending along the walls of the mixing chamber, said downwardly opening cavity means on the piston means being arranged to receive the hub and vane of the mixer means when the vane is in its contracted position.

8. A flavor mixing and dispensing device according to claim 7 including means on the piston means and mixer means for camming the vane into its contracted position when the piston means is moved from said raised toward said lowered position thereof.

9. A flavor mixing and dispensing device according to claim 7 wherein the vane is mounted on the hub for pivotal movement relative thereto about an axis paralleling the axis of the mixer shaft.

10. A flavor mixing and dispensing device according to claim 1 wherein said mixer means includes a central hub, a link pivotally attached to the hub for movement relative thereto about a link pivot axis transverse to the mixer shaft, and a vane pivotally attached to the link for movement relative thereto about a vane pivot axis parallel to and spaced from the link pivot axis.

11. A flavor mixing and dispensing device for a frozen confection machine comprising, a valve body adapted for mounting on the discharge end of a frozen confection freezer and having an upright valve cylinder therein, the lower portion of the valve cylinder defining a mixing chamber and having a discharge outlet at the lower end of the mixing chamber, a frozen confection inlet port opening into the cylinder at a location spaced above the discharge outlet and adapted to receive frozen confection from the freezing cylinder, at least one flavor inlet port opening into the cylinder at a location spaced above the discharge outlet and adapted for connection to a source of flavoring material, a rotatable mixer shaft extending axially of the cylinder and drive means connected to the upper end of the mixer shaft for rotating the mixer shaft, rotary mixer means disposed in the mixing chamber and including a hub mounted on the lower end of the mixer shaft and at least one vane extending outwardly from the hub, piston means slidably in the cylinder, the piston means including a member mounted on the lower end of the cylinder for vertical movement with the piston means and for rotation relative thereto about the axis of the cylinder, the member having a central cavity for receiving the hub of the mixer and at least one slot extending outwardly from the central cavity for receiving a vane on the mixer, said mixer means and said member being constructed and arranged to allow the mixer hub and vane to telescope into the central cavity and slot in the member and substantially fill the space in the mixing chamber when the piston is moved downwardly in the cylinder to a lower position in which the lower end of the member is adjacent the discharge outlet, said piston means being movable upwardly from said lower position to a raised position to expose the vane on the mixer and allow frozen confection material and flavoring material to enter through their respective ports into the cylinder.

12. A flavor mixing and dispensing device according to claim 11 wherein the valve body has a plurality of said flavor inlet ports and flavor selector means for controlling the supply of flavoring material to the flavor inlet ports.

13. A flavor mixing and dispensing device according to claim 11 including means drivingly connecting the mixer to the member on the piston means to rotate the member on the piston means in response to rotation of the mixer means when the piston means is in its raised position.

14. A flavor mixing and dispensing device for a frozen confection machine comprising, a valve body adapted for mounting on the discharge end of a frozen confection freezer and having an upright valve cylinder therein, the lower portion of the valve cylinder defining a mixing chamber and having a discharge outlet at the lower end of the mixing chamber, a frozen confection inlet port opening into the valve cylinder at a location spaced above the discharge outlet and adapted to receive frozen confection material from the frozen confection freezer, at least one flavor inlet port opening into the valve cylinder at a location spaced above the discharge outlet and adapted for connection to a source of flavoring material, a rotatable mixer shaft extending axially of the valve cylinder and drive means connected to the upper end of the shaft for rotating the mixer shaft, a rotary mixer means mounted on the lower end of the mixer shaft and disposed in the mixing chamber with the lower end of the rotary mixer means adjacent the discharge outlet, piston means mounted for sliding movement in the valve cylinder between a lower position in which the lower end of the piston means is adjacent the discharge outlet and a raised position in which the lower end of the piston means is spaced above the discharge outlet sufficient to allow frozen confection material and flavoring material to enter the valve cylinder, the rotary mixer including a hub on the lower end of the shaft and at least one vane mounted on the hub for movement relative thereto between a radially contracted position and a radially expanded condition extending along the walls of the mixing chamber, said piston means having a central cavity opening at its lower end of the piston means for telescopically receiving the mixer when the latter is in its radially contracted condition, said mixer being constructed and arranged to substantially fill said central cavity in the piston means when it is received therein.

15. A flavor mixing and dispensing device according to claim 14 wherein the vane is mounted on the hub for swinging movement relative thereto about an axis parallel to the axis of the mixer shaft.

16. A flavor mixing and dispensing device according to claim 14 including at least one link pivotally attached to the hub for movement relative thereto about a link pivot axis transverse to the mixer shaft, said at least one vane being pivotally attached to the link for movement relative thereto about a vane pivot axis parallel to and spaced from the link pivot axis.

17. A flavor mixing and dispensing device for a frozen confection machine comprising, a valve body adapted for mounting on the discharge end of a frozen confection freezer and having an upright valve cylinder therein, the lower portion of the valve cylinder defining a mixing chamber and having a discharge outlet at the lower end of the mixing chamber, a frozen confection inlet port opening into the valve cylinder at a location spaced above the discharge outlet and adapted to receive frozen confection material from the frozen confection freezer, at least one flavor inlet port opening into the valve cylinder at a location spaced above the discharge outlet and adapted for connection to a source of flavoring material, a rotatable mixer shaft extending axially of the valve cylinder and drive means connected to the upper end of the shaft for rotating, the mixer shaft, a rotary mixer means mounted on the lower end of the mixer shaft and disposed in the mixing chamber with the lower end of the rotary mixer means adjacent the discharge outlet, piston means mounted for sliding movement in the valve cylinder between a lower position in which the lower end of the piston means is adjacent the discharge outlet and a raised position in which the lower end of the piston means is spaced above the discharge outlet sufficient to allow frozen confection material and flavoring material to enter the valve cylinder, the rotary mixer including a hub on the lower end of the shaft and at least two vanes mounted on the hub for movement relative thereto between a radially contracted position and a radially expanded condition extending along the walls of the mixing chamber, the vanes and hub being constructed and arranged to form a generally cylindrical body when the vanes are in said radially contracted position, said piston means having a central generally cylindrical cavity opening at its lower end for receiving the mixer when the vanes are in their radially contracted condition, the body being adapted to substantially fill the central cavity in the piston means when the latter is in its lower position.

* * * * *